United States Patent [19]

Hawkes

[11] 4,289,326
[45] Sep. 15, 1981

[54] COLLAPSIBLE TRIPODS

[75] Inventor: Peter C. Hawkes, Rugby, England

[73] Assignee: Andrews MacLaren Limited, Long Buckby, England

[21] Appl. No.: 70,118

[22] Filed: Aug. 27, 1979

[30] Foreign Application Priority Data

Aug. 25, 1978 [GB] United Kingdom ............... 34695/78

[51] Int. Cl.³ ............................................. B62D 3/04
[52] U.S. Cl. .................................. 280/646; 280/652;
280/DIG. 6; 297/217; 248/171
[58] Field of Search ................. 280/DIG. 6, 652, 645,
280/641, 646, 638; 297/217, 45, 43, 5; 248/168,
169, 171

[56] References Cited

U.S. PATENT DOCUMENTS

| 2,563,033 | 8/1951 | Greig | 280/42 |
| 2,626,814 | 1/1953 | Chamberlin | 280/42 |
| 2,647,762 | 8/1953 | Jamieson et al. | 280/646 |
| 2,740,638 | 4/1956 | Chamberlin et al. | 280/42 |
| 2,782,048 | 2/1957 | Williams et al. | 280/DIG. 6 |
| 3,310,340 | 3/1967 | Brewer et al. | 297/217 X |
| 3,459,434 | 8/1969 | Dulaney | 280/DIG. 6 |
| 3,997,213 | 12/1976 | Smith et al. | 280/652 X |

FOREIGN PATENT DOCUMENTS 138870 2/1948 Australia ..................... 280/DIG. 6
941603 11/1963 United Kingdom .

Primary Examiner—John J. Love
Assistant Examiner—D. W. Underwood
Attorney, Agent, or Firm—Bucknam and Archer

[57] ABSTRACT

First and second legs (4 and 5) of a collapsible tripod (1) are pivoted to a third leg (6) and interconnected by two interpivoted bracing links (15 and 16).

To swing the first and second legs (4 and 5) towards and away from the third leg (6), first and second tie members (24 and 25) extend, respectively, from the first and second legs (4 and 5) to an actuating member (18) which is movable longitudinally of the third leg (6).

To prevent relative movement between the legs (4, 5 and 6), when the tripod (1) is in its extended condition, a control link (32) extends from the pivotal interconnection between the two bracing links (15 and 16) and the actuating member (18) and locking means (21) are provided for releasably locking the actuating means (18) to the third leg (6).

8 Claims, 12 Drawing Figures

COLLAPSIBLE TRIPODS

TECHNICAL FIELD OF THE INVENTION

The invention relates to collapsible tripods such as those used in the construction of portable stools and trolleys, for example golf trolleys, and two-wheeled push-chairs. These tripods are convertible from an extended condition, in which the three legs diverge from their upper ends, to a collapsed condition in which the three legs lie alongside each other.

BACKGROUND ART

Collapsible tripods are normally provided with first, second and third elongate legs which each have a head end and a foot end; first and second upper pivot members respectively supported on the third leg, adjacent the head end of the third legs, and respectively engaging the head ends of the first and second legs for pivotal movement of the first and second legs between a first configuration, corresponding to an extended condition of the tripod, in which the first, second and third legs mutually diverge from their head ends and their foot ends are disposed at the vertices of an imaginary triangle, and a second configuration, corresponding to a collapsed condition to the tripod, in which the first and second legs lie alongside the third leg; first and second bracing links respectively pivoted to the first and second legs; and a first single pivot member interconnecting the bracing links.

Although the bracing links can sometimes serve satisfactorily as tie members, when subjected to tensile loading, they are normally quite unsatisfactory as strut members when subjected to compressive loading because of the tendency of the bracing links to articulate about their pivotal interconnection. This means that if the first and second legs are to braced securely, it is necessary to provide the bracing links with some form of releasable locking means. This is particularly important where, for example, the collapsible tripod forms part of a golf trolley and the first and second legs carry the wheels of the golf trolley. Unless the wheels are braced against inward movement, the trolley will tend to collapse when leaned to one side as, for example, when travelling across rough country.

This means that, in order to collapse the tripod, it is necessary to carry out a preliminary operation in order to free the bracing links. Moreover, it is quite common for bracing links to be positioned between the first and third legs and between the second and third legs so that a number of unlocking and locking operations have to be performed in order to collapse or extend the tripod.

DISCLOSURE OF THE INVENTION

It is therefore an object of the present invention to provide a collapsible tripod in which the bracing of adjacent legs, when the tripod is in its extended condition, is simplified, thereby facilitating conversion of the tripod between its extended and collapsed conditions.

In order to achieve this beneficial effect, a collapsible tripod is constructed so as to comprise first, second and third elongate legs which each have a head end and a foot end; an elongate actuating member, having a head end and a foot end, connected to the third leg for movement relative to the third leg between first and second positions in which the foot end of the actuating member is closer to and further from the head end of the third leg; locking means for releasably securing the actuating member in its first position; first and second upper pivot members supported on the third leg, adjacent the head end of the third leg, and respectively engaging the head ends of the first and second legs for pivotal movement of the first and second legs between a first configuration, corresponding to an extended condition of the tripod, in which the first, second and third legs mutually diverge from their head ends and their foot ends are diposed at the vertices of an imaginary triangle, and a second configuration, corresponding to a collapsed condition of the tripod, in which the first and second legs lie alongside the third leg; first and second lower pivot members supported on the actuating member, adjacent the foot end of the actuating member; first and second tie members having head ends respectively engaging the first and second lower pivot members and having foot ends respectively pivoted to the first and second legs; first and second bracing links respectively pivoted to the first and second legs; a first single pivot member interconnecting the bracing links and movable between first and second positions respectively closer to and further from the head ends of the first and second legs and respectively occupied by the first single pivot member when the tripod is in its extended and collapsed conditions; a second single pivot member attached to the actuating member and having a pivotal axis extending transversely of the actuating member; a third single pivot member, which may be an extension of the first single pivot member, but is preferably supported by the first single pivot member and has a pivotal axis extending perpendicular to the pivotal axis of the first single pivot member and parallel to the pivotal axis of the second single pivot member; and a control link having head and foot ends respectively connected to the second and third single pivot members so as to move the first single pivot member between its first and second positions during pivotal movement of the first and second legs between their first and second configurations and to hold the first single pivot member in its first position when the first and second legs are in their first configuration and the tripod is in its extended condition, to thereby brace the first and second legs relative to each other. Theoretically, this may be achieved by ensuring that as the angles between the actuating member and each of the first and second tie members and between the first and second bracing links increase on movement of the first single pivot member from its second position to its first position, the angles between the actuating member and each of the first and second tie members become 90° at the same instant that the angle between the first and second bracing links becomes 180°. However, it is found in practice that that this condition is not critical and that adequate performance is obtained even if these two angular configurations do not take place absolutely simultaneously. For example, quite satisfactory results are obtained where the angle between the bracing links lies between 170° and 190° when the angles between the actuating member and each of the first and second tie members are 90° and it has been found that there is usually sufficient clearance in the pivotal interconnections between the members of the tripod to permit the tripod to be easily articulated between its extended and collapsed conditions. During this conversion of the tripod, it is merely necessary to ensure that as the first and second legs swing through intersecting planes, towards and away from each other, this movement is not prevented by the independent movement of the bracing members. The tripod may therefore be constructed so that one or both of these limiting angular configurations is never exceeded. For example, the tripod may be constructed so that the maximum angle between the bracing links is 180° and the angles between the actuating member and each of the first and second tie members are always less than 90°.

In a preferred embodiment of the invention, the first, second and third legs are rectilinear; the first and second legs are of equal length; and the first and second tie members are also of equal length. In this arrangement, the first and second upper pivot members may be disposed symmetrically on opposite sides of the head end of the third leg and the first and second lower pivot members may be symmetrically disposed on opposite sides of the foot end of the actuating member. Moreover, to accommodate the first and second tie members between the first and second legs, when the tripod is in its collapsed condition, the first and second upper pivot members should be more widely spaced than the first and second lower pivot members and, for the sake of compactness when the tripod is in its collapsed condition, the first upper and lower pivot members should be parallel with each other and the second upper and lower pivot members should also be parallel with each other.

Three embodiments of the invention are hereinafter described, by way of example, with reference to the accompanying drawings.

BEST MODES FOR CARRYING OUT THE INVENTION

Figure 1:
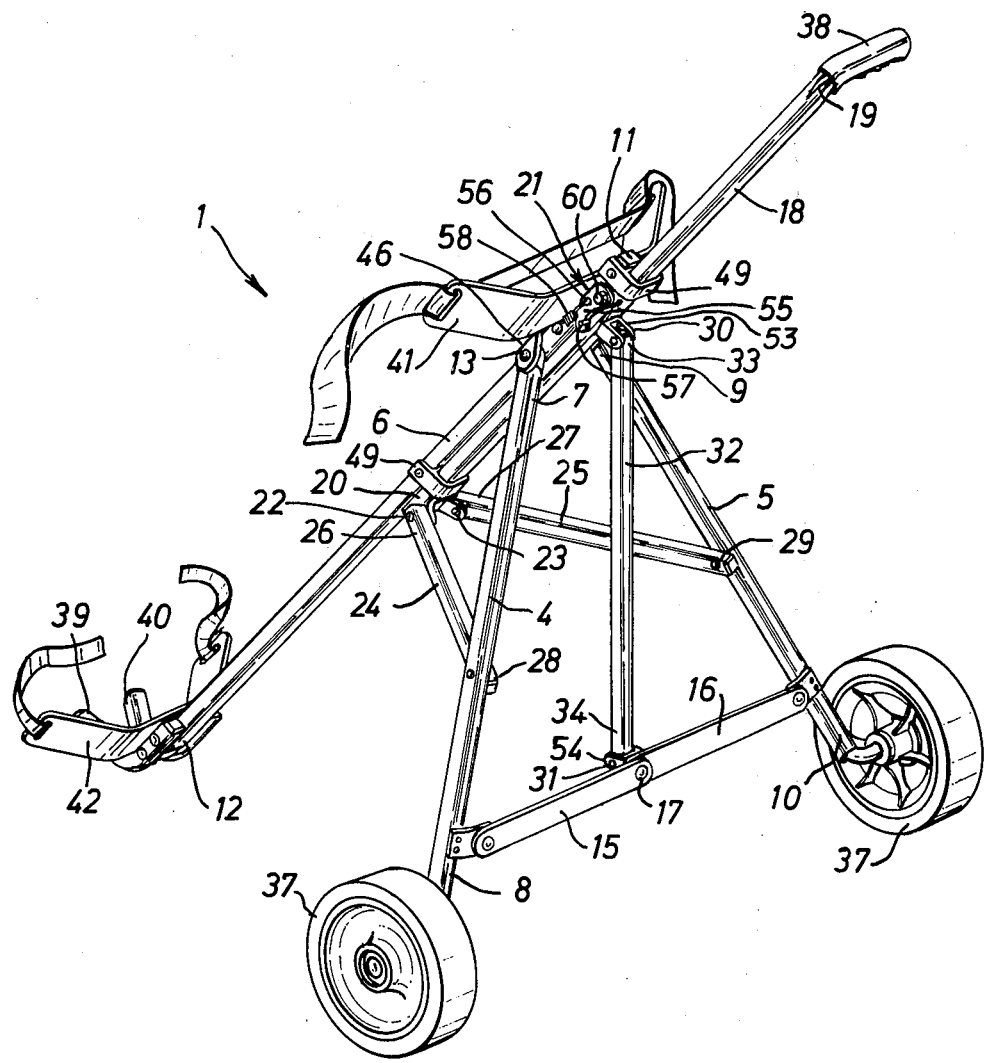
FIG. 1 is an isometric view of a golf trolley provided with a collapsible tripod in accordance with the invention.
Figure 2:
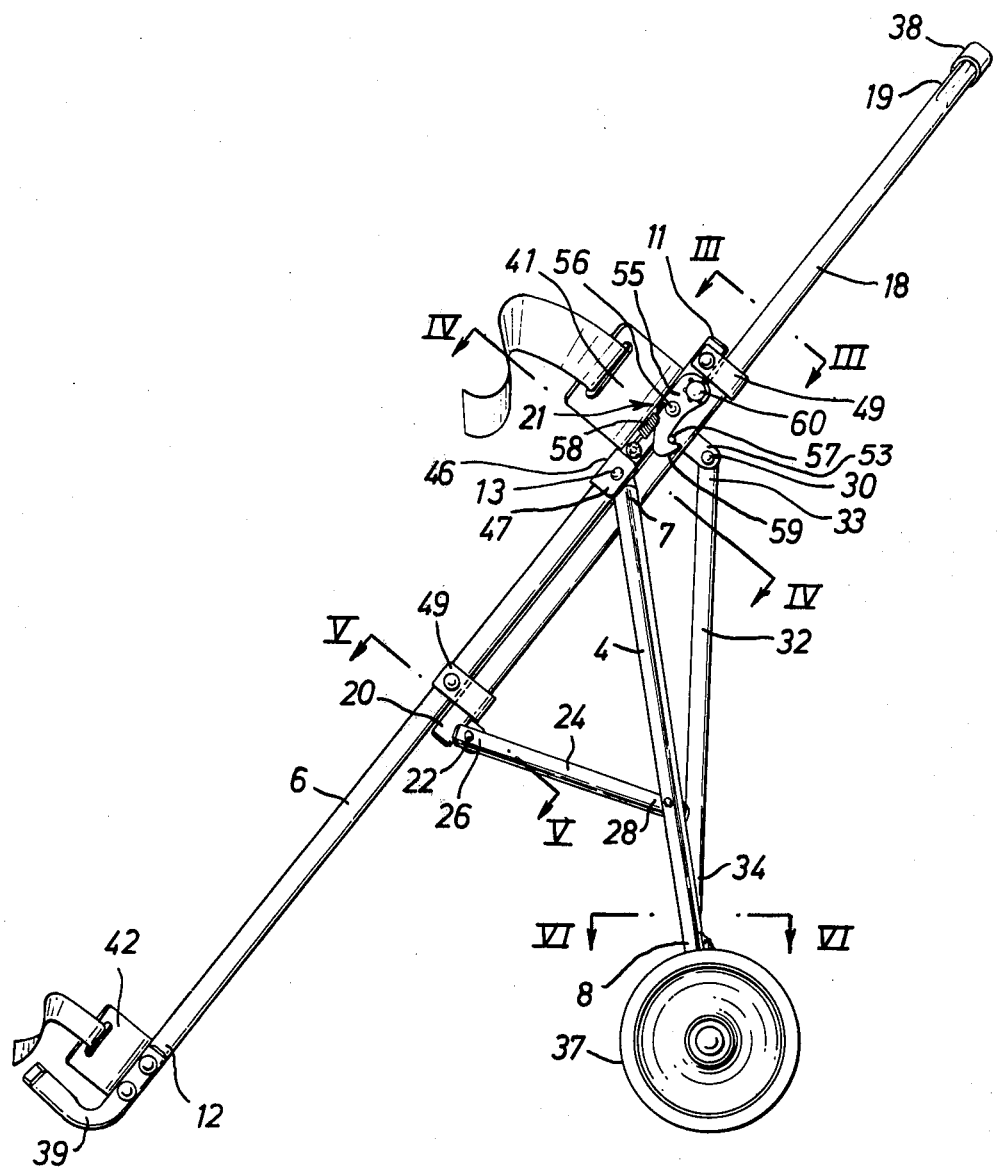
FIG. 2 is a side elevation of the golf trolley shown in FIG. 1.

The golf trolley shown in FIG. 1 has a collapsible tripod 1 having first, second and third legs 4, 5 and 6. A bracket 46 attached to the head end 11 of the third leg 6 is a metal plate having bent ends 47 and 48 carrying first and second upper pivot pins 13 and 14, as shown more clearly in FIG. 4. These pins 13 and 14 pivotally support the head ends 7 and 9 of the first and second legs 4 and 5.

Figure 4:
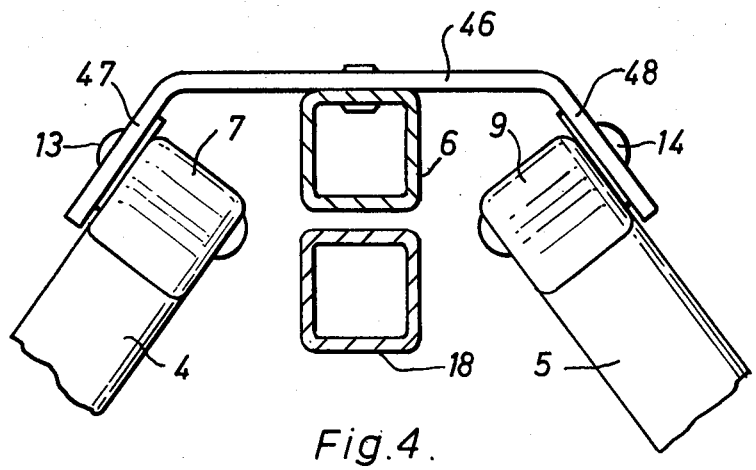
Figure 5:
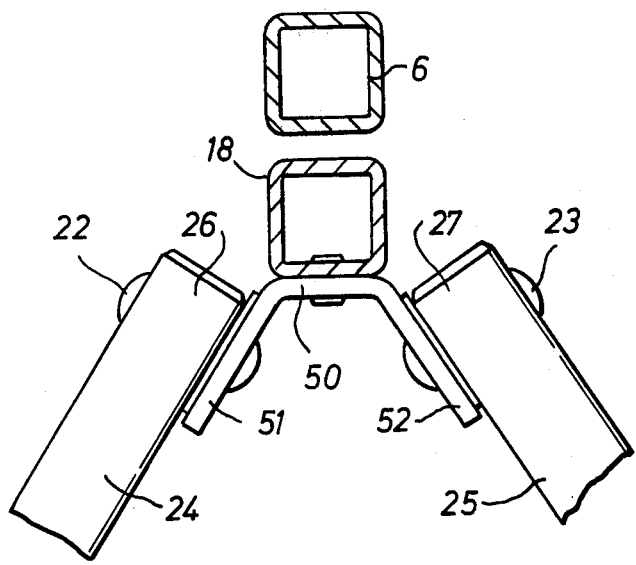
Figure 8:
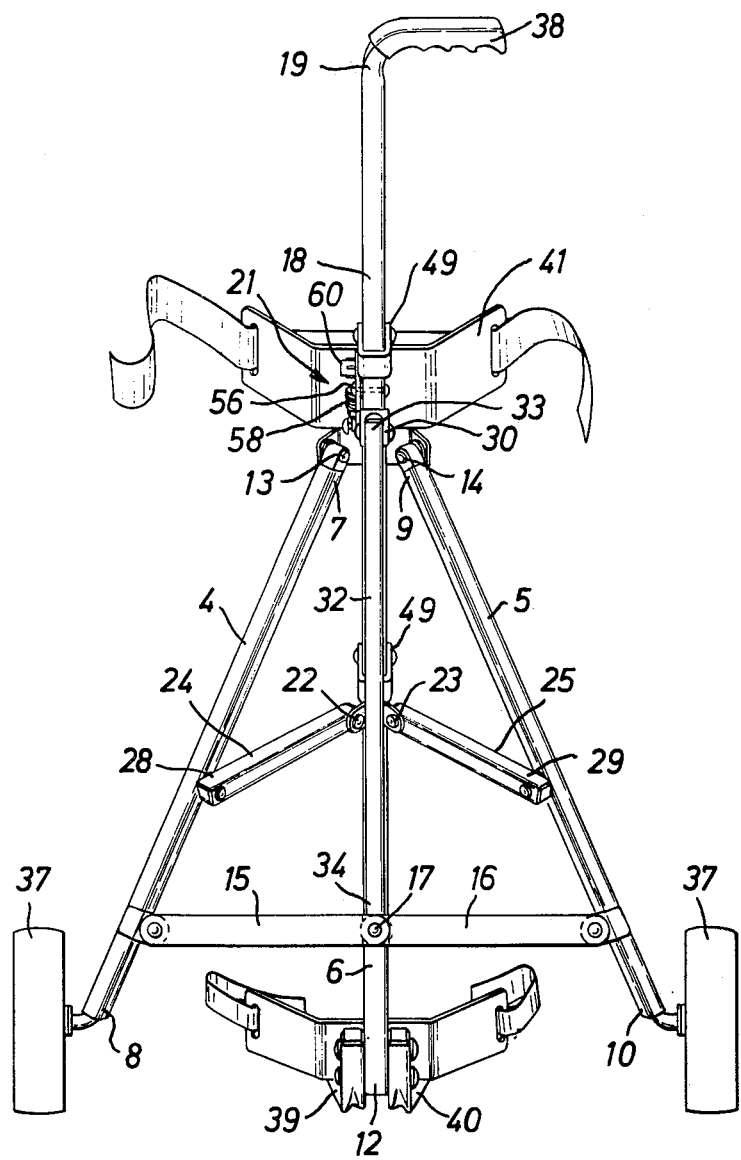

Two plastic guide members 49 are attached to spaced portions of the third leg 6 so as to support an elongate actuating member 18 for sliding movement along the underside of the third leg 6 from a first position as shown in FIG. 1 to a second position in which the foot end 20 of the actuating member 19 is further from the head end 11 of the third leg 6, as when the tripod 1 is in the collapsed condition shown in FIG. 8. A further bracket 50, attached to the foot end 20 of the actuating member 18 consists of a metal plate having two bent ends 51 and 52 respectively carrying first and second lower pivot pins 22 and 23, as shown more clearly in FIG. 5. The head ends 26 and 27 of two tie members 24 and 25 are pivotally supported on these pins 22 and 23 and the foot ends 28 and 29 of the tie members 24 and 25 are pivotally connected to the first and second legs 4 and 5. As shown in FIGS. 4 and 5, the bent ends 47 and 48 of the bracket 46 extends symmetrically on opposite sides of the third leg 6 and, similarly, the bent ends 51 and 52 of the bracket 50 extends symmetrically on opposite sides of the actuating member 18. Moreover, pins 13 and 22 are parallel with each other and pins 14 and 23 are also parallel with each other.

Wheels 37 are mounted at the foot ends 8 and 10 of the first and second legs 4 and 5 and two "L"-shaped members 39 and 40 are attached to opposite sides of the foot end 12 of the third leg 6 so as to provide end support for a golf bag (not shown) mounted on the golf trolley. Two concave plates 41 and 42 respectively connected to the head and foot ends 11 and 12 of the third leg 6 provide a cradle support for the golf bag and may be fitted with fastening straps in conventional manner. To facilitate handling of the golf trolley, the head end 19 of the actuating member has a bent portion providing a handle 38.

Figure 3:
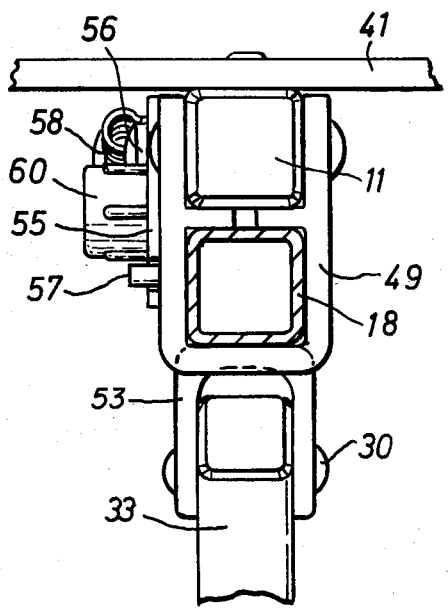
FIGS. 3, 4, 5 and 6 are sectional views of parts of the golf trolley, taken across the sections III—III, IV—IV, V—V and VI—VI.
Figure 6:
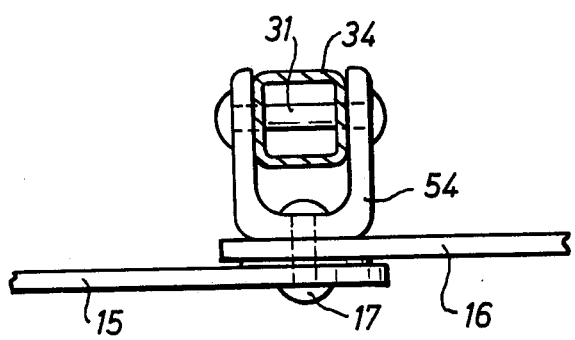
Figure 7:
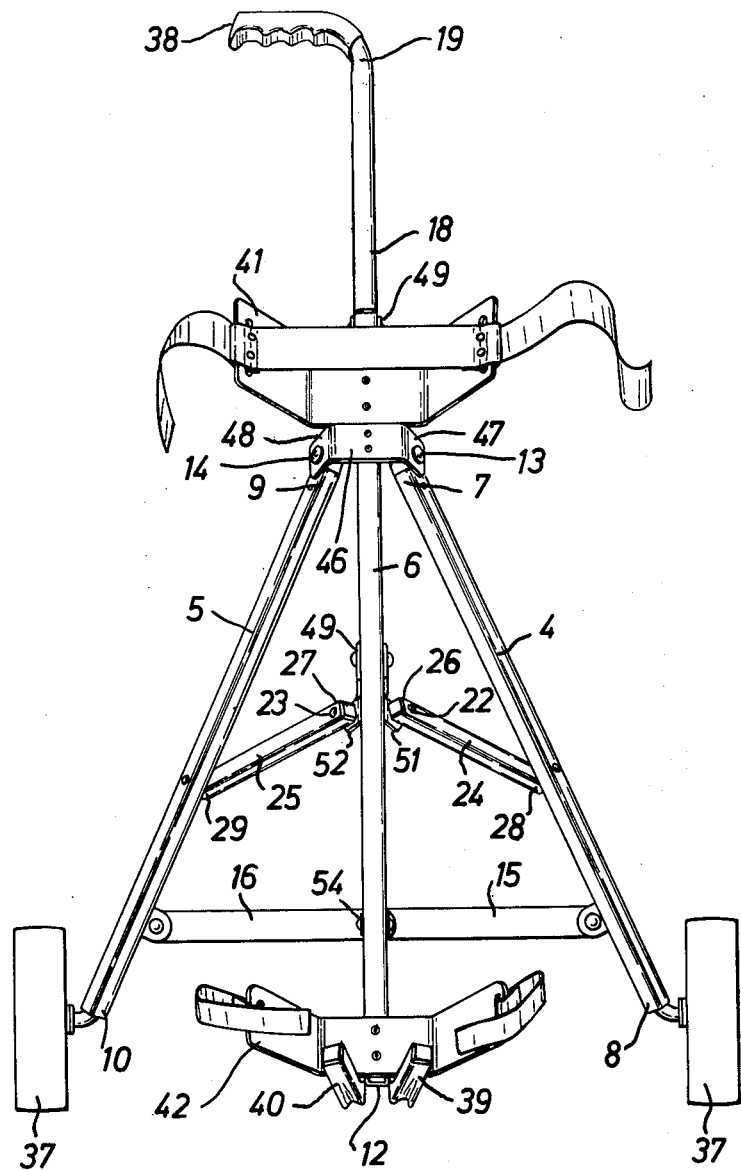
FIGS. 7 and 8 are front and rear elevational views of the golf trolley, when in its extended condition.

In order to stiffen the golf trolley, two bracing links 15 and 16 are respectively pivoted to the first and second legs 4 and 5 and these links 15 and 16 are pivotally interconnected by a first single pivot pin 17. A second single pivot pin 30, extending transversely of the actuating member 18 is carried by a first bifurcated bracket 53 attached to the actuating member 18 and a third single pivot pin 31 is carried by a second bifurcated bracket 54 which is attached to the first single pivot pin 17. This second bifurcated bracket 54 is arranged so that the first and third single pivot pins 17 and 31 are perpendicular to each other and the second and third single pivot pins 30 and 31 are parallel with each other. A control link 32 extends between the first and second bifurcated brackets 53 and 54 with the head and foot ends 33 and 34 of the control link 32 pivotally bearing on the second and third single pivot pins 30 and 31, as shown in FIGS. 3 and 6. Finally, releasable locking means 21 are provided for securing the tripod 1 in its extended position. These locking means 21 comprise a hook-shaped plate member 55 connected to the head end 11 of the third leg 6 by means of a pivot pin 56 which engages a pin 57 attached to the actuating member 18. A helical tension spring 58 attached to the third leg 6 and the hook-shaped plate member 55 resiliently urges the hook-shaped plate member 55 into a position such that an inclined edge 59 extends across the actuating member 18. The hook-shaped plate member 55 is also provided with a knob 60 to facilitate pivotal movement of the hook-shaped plate member 55 about the pivot pin 56.

Figure 9:
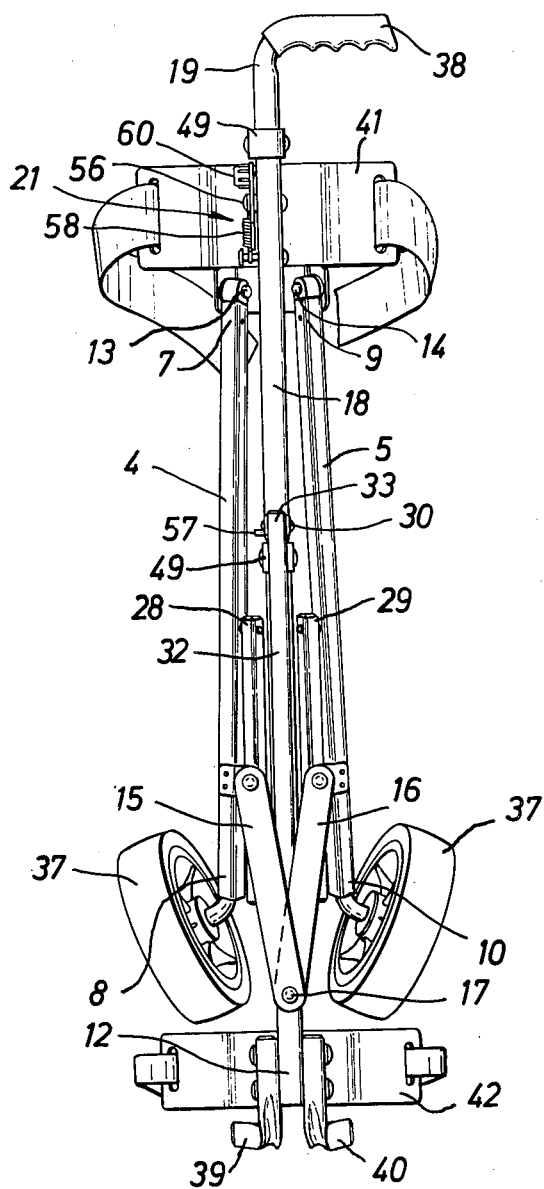
FIG. 9 is a rear elevation of the golf trolley in its collapsed condition.

In order to convert the golf trolley from its extended condition, as shown in FIGS. 1, 2, 7 and 8 to its collapsed condition, as shown in FIG. 9, the knob 60 of the locking means 21 is moved so as to extend the tension spring 58 and to release the pin 57 from the hook-shaped plate member 55. The handle 38 is then pressed downwards so as to slide the actuating member 18 through the guide members 49 to the second position of the actuating member 18 in which the foot end 20 of the actuating member 18 lies adjacent the foot end 12 of the third leg 6. During this movement of the actuating member 18, the tie members 24 and 25 cause the first and second legs 4 and 5 to swing through planes respectively perpendicular to the pivotal axes of the first and second upper pivot members 13 and 14. This movement of the actuating member 18 also causes the control link 32 to press the first single pivot pin 17 away from the head ends 7 and 9 of the first and second legs 4 and 5, thus causing the angle between the first and second bracing links 15 and 16 to decrease.

The path of movement followed by the first single pivot pin 17 is dictated by two independent requirements which must both be fulfilled in a compatible manner. Thus, as the first single pivot pin 17 is situated at the foot end 34 of the control link 32, its motion must conform with the compound motion resulting from pivotal movement of the third single pivot pin 31 about the second single pivot pin 30 and by the translational movement of the second single pivot pin 30 during movement of the actuating member 18 from its first to its second position. The motion of the first single pivot pin 17 must also conform with the compound motion effected by the outer ends of the bracing links 15 and 16 as a result of the first and second legs swinging through planes which are symmetrically inclined on opposite sides of a plane containing the path of movement of the first single pivot pin 17 and also by the movement effected by the interconnected ends of the first and second bracing links 15 and 16 as they pivot about their outer ends.

In order to re-erect the golf trolley, it is merely necessary to pull the handle 38 so as to slide the actuating member 18 from its second position to its first position. During this movement of the actuating member 18 the pin 57 attached to the actuating member 18 deflects the inclined edge 59 of the hook-shaped plate member 55 and thereby extends the helical tension spring 58. As soon as the pin 57 has slid over the inclined edge 59, the spring 58 returns the hook-shaped plate member 55 to its original position, in locking engagement with the pin 57. In this extended condition of the golf trolley, the tie member 24 and 25 adequately brace the first and second legs 4 and 5 relative to the third leg 6. Moreover, because the position of the first single pivot pin 17 is controlled by the control link 32, any tendency of the bracing links 15 and 16 to articulate about the first single pivot pin 17 is adequately resisted.

Figure 10:
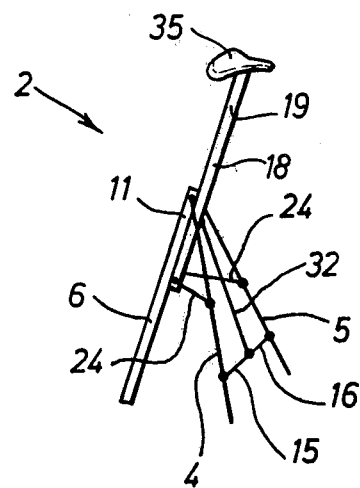
FIG. 10 is an isometric view of a second embodiment of the invention in which a collapsible tripod is provided with a seat for use as a stool.
Figure 12:
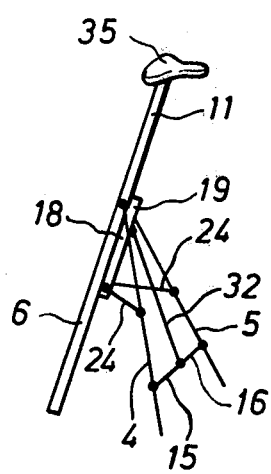
FIG. 12 is an isometric view of a fourth embodiment of the invention in which a collapsible tripod is provided with a seat for use as a stool.

In the stool shown in FIG. 10, the actuating member 18 of a collapsible tripod 2 is fitted with a seat 35 at its head end 19. In other essential respects, the collapsible tripod 2 is identical with the collapsible tripod 1 described and illustrated in FIGS. 1 to 9. However, as the stool is required for use similar to that of a hunting-stick, there is no need to provide wheels at the foot end of the first and second legs 4 and 5 and there is no need to provide golf bag support means on the third leg 6. It is also clear that the inclination of the third leg 6 and the actuating member 18 differs from the inclination of the corresponding members in the collapsible tripod 1 forming the basis of the golf trolley. In a modification of the construction illustrated in FIG. 10, the seat 35 is fitted to the head end 11 of the third leg 6 and, in this case, the actuating member 18 is of reduced length so that its head end is always disposed below the seat 35, as shown in FIG 12.

Figure 11:
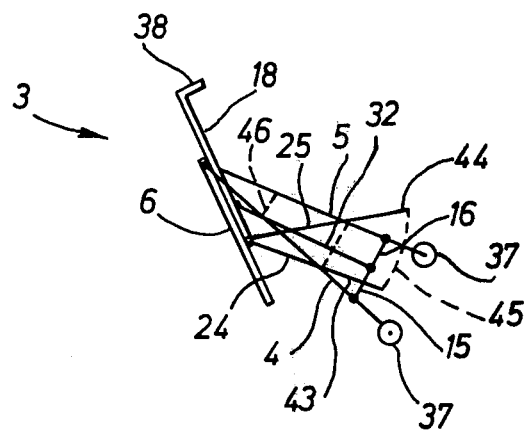
FIG. 11 is an isometric view of a third embodiment of the invention in which a collapsible tripod forms part of a two-wheeled push-chair.

In the third embodiment of the invention illustrated in FIG. 11, a collapsible tripod 3 forms the basis of a two-wheeled push-chair. Although the collapsible tripod 3 is in all essential features identical with the collapsible tripods 1 and 2 forming the basis of the golf trolley and stool described with reference to FIGS. 1 to 10, the inclination of the legs 4, 5 and 6 differs in accordance with the application of the collapsible tripod 3 as the frame of a push-chair. Wheels 37 are fitted to the foot ends of the first and second legs 4 and 5 and the third leg 6 is shortened so that its foot end will serve as a prop when the push-chair is standing still, but can be lifted from the ground so as to allow the push-chair to be wheeled along the ground. In addition, the tie members 24 and 25 are provided with extensions 43 and 44 for supporting a seat 45 of pliable sheet material such as plastic sheeting or canvas. A back rest 46 of similar material is slung between adjacent portions of the first and second legs 4 and 5, above the seat 45.

Of course, various other applications may be made of collapsible tripods according to the invention. Thus, for example, wheels may be provided at the foot end of all three legs and load support means may be slung from the legs of the collapsible tripod so as to provide a collapsible shopping basket.

In a less satisfactory, but simplified version of each of the illustrated constructions, the third single pivot member consists of an extension of the first single pivot member 17. In this case, pivotal movement of the foot end 34 of the control link 32 about an axis extending perpendicular to the first single pivot member 17 and parallel to the pivotal axis of the second single pivot member 30 takes place as a result of clearance between the extension forming the third single pivot member and the accommodating aperture in the foot end 34 of the control link 32 and also as a result of clearance between the first single pivot member 17 and the accommodating holes in the first and second bracing links 15 and 16.

Although reference numerals have been used in the appended claims to improve the intelligibility of these claims, it is expressly stated that these reference numerals should not be construed as limiting the claims to the constructions illustrated in the accompanying drawings.

I claim:

1. A collapsible tripod (1, 2 or 3) comprising:
   first, second and third elongate legs (4, 5 and 6) which each have a head end and a foot end (7 and 8, 9 and 10, and 11 and 12);
   first and second upper pivot members (13 and 14) respectively supported on the third leg (6), adjacent the head end (11) of the third leg (6), and respectively engaging the head ends (7 and 9) of the first and second legs (4 and 5) for pivotal movement of the first and second legs (4 and 5) between a first configuration, corresponding to an extended condition of the tripod (1, 2 or 3), in which the first, second and third legs (4, 5 and 6) mutually diverge from their head ends (7, 9 and 11) and their foot ends (8, 10 and 12) are disposed at the vertices of an imaginary triangle, and a second configuration, corresponding to a collapsed condition of the tripod (1, 2 or 3), in which the first and second legs (4 and 5) lie alongside the third leg (6);
   first and second bracing links (15 and 16) respectively pivoted to the first and second legs (4 and 5); and
   a first single pivot member (17) interconnecting the bracing links (15 and 16);
   characterised in that:

an elongate actuating member (18), having a head end (19) and a foot end (20), is connected to the third leg (6) for movement relative to the third leg (6) between first and second positions in which the foot end (20) of the actuating member (18) is closer to and further from the head end (11) of the third leg (6);

locking means (21) are provided for releasably securing the actuating member (18) in its first position, relative to the third leg (6);

first and second lower pivot members (22 and 23) are supported on the actuating member (18), adjacent the foot end (20) of the actuating member (18);

first and second tie members (24 and 25) have head ends (26 and 27) respectively engaging the first and second lower pivot members (22 and 23) and have foot ends (28 and 29) respectively pivoted to the first and second legs (4 and 5);

a second single pivot member (30) is attached to the actuating member (18) and has a pivotal axis extending transversely of the actuating member (18);

a third single pivot member (31) is supported by the first single pivot member (17); and a control link (32) has head and foot ends (33 and 34) respectively connected to the second and third single pivot members (30 and 31) so as to move the first single pivot member (17) between first and second positions respectively closer to and further from the head ends (7 and 9) of the first and second legs (4 and 5) during pivotal movement of the first and second legs (4 and 5) between their first and second configurations and during pivotal movement of the foot end (34) of the control link (32) about an axis extending perpendicular to the first single pivot member (17) and parallel to the pivotal axis of the second single pivot member (30), and so as to hold the first single pivot member (17) in its first position when the first and second legs (4 and 5) are in their first configuration and the tripod (1, 2 or 3) is in its extended condition, to thereby brace the first and second legs (4 and 5) relative to each other.

2. A collapsible tripod (1, 2 or 3), according to claim 1, characterised in that the third single pivot member (31) has an axis coincident with said axis extending perpendicular to the pivotal axis of the first single pivot member (17) and parallel to the pivotal axis of the second single pivot member (30).

3. A collapsible tripod (1, 2 or 3), according to claim 1, characterised in that:
the first, second and third legs (4, 5 and 6) are rectilinear;
the first and second legs (4 and 5) are of equal length; and
the first and second tie members (24 and 25) are of equal length.

4. A collapsible tripod (1 or 3), according to claim 1, characterised in that wheels (37) are mounted at the foot ends (8 and 10) of the first and second legs (4 and 5) and the head end (19) of the actuating member (18) is provided with a handle (38).

5. A collapsible tripod (3), according to claim 1, characterised in that:
the tie members (24 and 25) have extensions (43 and 44) which project from the foot end (20) of the actuating member (18) beyond the first and second legs (4 and 5); and
load support means (45) are suspended from these extensions (43 and 44).

6. A collapsible tripod (1), according to claim 4, characterised in that:
end support means (39 and 40) are provided at the foot end (12) of the third leg (6); and
golf bag supports (41 and 42) are provided at the head and foot ends (11 and 12) of the third leg (6).

7. A collapsible tripod (2), according to claim 1, characterised in that load support means (35) are mounted on the head end (19) of the actuating member (18), when the tripod (2) is in its extended condition, and the foot ends (8, 10 and 12) of the three legs (4, 5 and 6) rest on a flat support surface (36).

8. A collapsible tripod, according to claim 1, characterised in that load support means (35) are mounted on the head end (11) of the third leg (6) when the tripod (2) is in its extended condition, and the foot ends (8, 10 and 12) of the three legs (4, 5 and 6) rest on a flat support surface (36).

* * * * *